United States Patent Office 3,543,150
Patented Nov. 24, 1970

3,543,150
ARRANGEMENT FOR DETERMINING AND DIGITALLY INDICATING THE DISPLACEMENT OF MOVING BODIES
Klaus Brandenburg, Hamburg, Germany, assignor, by mesne assignments, to U.S. Philips Corporation, New York, N.Y., a corporation of Delaware
Filed Oct. 18, 1967, Ser. No. 676,134
Claims priority, application Germany, Oct. 29, 1966, P 40,697
Int. Cl. G01r 25/00
U.S. Cl. 324—83         5 Claims

ABSTRACT OF THE DISCLOSURE

A digital phase angle converter in which a divider in response to pulses produced by a constant frequency generator during one cycle of a phase modulated measuring signal opens a gate to conduct the pulses to a recycling counter. The division ratio of the divider and the capacity of the counter are greater than twice the maximum number of angle increments arising in a measuring signal cycle, but are a small fraction of the total number of generator pulses produced during one cycle of the measuring signal. The counter therefore counts to its capacity several times during each measuring cycle.

---

The present invention relates to an arrangement for determining and digitally indicating the relative translational or angular displacement of moving bodies.

Some of the known arrangements of this type have the property of being capable to resolve a length or an angle to a degree which is considerably higher than the degree of subdivision of the measuring standard used. High resolution can thus be obtained even when using measuring standards having a coarse subdivision. In connection herewith it may be pointed out, that it is not difficult to generate for instance by capacitive or inductive scanning, a signal representing the quantity to be measured. In this type of arrangement interpolation between the marks of the measuring standard is carried into effect, by determining the phase displacement of an alternating voltage. This voltage may be generated by means of continuously rotating scanning discs, or by means of rotating or translating fields. As soon as the scanning device and the measuring standard are in relative motion, the frequency of the alternating voltage increases or decreases. The phase displacement with respect to a predetermined phase, hereafter called the phase change, resulting from this motion can be measured and be utilized in various ways in order to determine the quantity to be measured. In these arrangements a phase change of 360° corresponds to one unit of the measuring standard, or as may be, to half a unit.

In the arrangement described in the U.S. patent specification 2,717,987 to G. E. Hagen, filed Oct. 3, 1949, the alternating voltage, whose phase is a measure for an angle, is generated by means of a rotating disc. A second alternating voltage, whose phase is constant and thus independent of the quantity to be measured, serves as a reference voltage. In separate channels comprising filters, resonant circuits, phase shifters and electron tubes the two voltages are passed through several stages of frequency multiplication. By phase comparison of the output voltages of the two channels a phase change is obtained. This phase change is now subdivided, according to the rate of frequency multiplication, in smaller steps as compared with the subdivision of the phase change of the original voltage generated by the disk.

This arrangement has the disadvantage that substantial equipment has to be provided for the frequency multiplication. Besides, only very small variations of the quantity to be measured are detected and indicated.

In the U.S. Pat. 3,206,616 to R. C. Webb, filed Mar. 4, 1959, as well as in "Electronics," 16 (1959) a step angle generator of high resolution has been described comprising two continuously rotating dividing discs of rather coarse division respectively cooperating with a stationary disc and a disc fixed to the measuring spindle. From each pair of discs an alternating voltage is derived. Furthermore a pulse generator of variable and adjustable frequency is associated with each pair of discs and means are provided for counting the number of pulses falling in a period of the respective alternating voltage. Each generator is so controlled that the number of pulses contained in a period is always the same. The pulses of the two generators are supplied to separate inputs of a differential counter. When the measuring spindle is rotating, the counter indicates, with the proper sign, the variations of the quantity to be measured and these variations are subdivided in so many fractions of a section of the dividing discs as correspond to the number of pulses contained in a period of the alternating voltages.

This arrangement has the disadvantage that substantial apparatus is required for the frequency control of the variable frequency generator. Still more equipment is required if this control should be arranged so that it will follow even rapid variations of the rotating measuring spindle. As however, the measured value and the prescribed value are compared only at the end of a period of the alternating voltages, the possibility of control is limited.

It is possible to determine the phase change in a continuous way by determining and transferring the variations of successive pulse counts. This will be explained with reference to FIG. 1 which is however not based on the concept underlying the invention.

In FIG. 1 the angular position defined by the angle $\alpha$ of a rotor running at a constant speed, is represented as a function of time $t$ by a straight line $a$. After each time interval $t_0$ the rotor will have covered the angle of subdivision $2\pi/n$ ($n$=number of division) of the dividing disc fixed to the measuring spindle. When the latter is at rest one period of the alternating voltage U, generated by the rotor-dividing disc, will likewise be terminated after each time interval $t_0$. When, on the other hand, the measuring spindle is rotating, the period of the alternating voltage is shortened or lengthened and accordingly the pulses marking the end of a period will appear at earlier or later moments ($u$, $v$, $w$). The time ($t_u$, $t_v$, $t_w$) elapsing from the moment at which a marking pulse appears up to the moment $n(t_0)$ under consideration is a measure for the angle covered by the measuring spindle up to this moment.

In case the time is counted not by uniform steps such that the period $t_0$ is determined by counting the pulses directly from the end of a period ($u$, $v$, $w$) then the intervals $t_1$, $t_2$, $t_3$ will be a measure for the variation of the angular position during the last period.

It is not essential to use a rotor for generating the alternating voltage whose phase depends on the angular position of the measuring spindle; this voltage can also be obtained in known manner with the aid of a rotating field. It will furthermore be clear, that a translational motion can be determined in a way similar to that described above for a rotational motion.

It will appear from FIG. 1 that in order to determine the phase change resulting from the variation of the quantity to be measured, it is necessary to measure while the measuring spindle is at rest, the time differences between the intervals $t_1$, $t_2$, $t_3$ . . . and the period $t_0$. Consequently in case a period is to be divided in $n$ parts, or in other words, if the resolution is to be increased $n$ times, counters must be provided which have a capacity $n$. It requires extensive equipment to realize counters of such capacity. Additional apparatus would be needed for overlapping the counting periods $t_0$.

It is the object of the invention to provide an arrangement of the type mentioned which has a high resolution and wihich is of substantial simpler construction than the arrangement hiterto known.

The invention relates to an arrangement for determining and digitally indicating the relative translational or angular displacement of moving bodies in which there is generated by means known per se, such as scanning discs rotating or travelling fields, at least one alternating voltage whose phase is proportional to the variation of the quantity to be measured. The invention is characterized in that in order to determine the phase change. There is provided a frequency divider and a counter, the frequency division ratio of the divider, and the capacity of the counter is so small that the cycle of frequency division and the cycle of counting are traversed several times in a period of the alternating voltage. The invention is further characterized in that at the end of each period the position of the counter is registered and the counter reset at "0" whereafter a new measuring cycle is started.

The invention will be explained in more detail with reference to the drawing in which FIG. 1 shows the phase change of the measured quantity at different time intervals.

Figure 1:
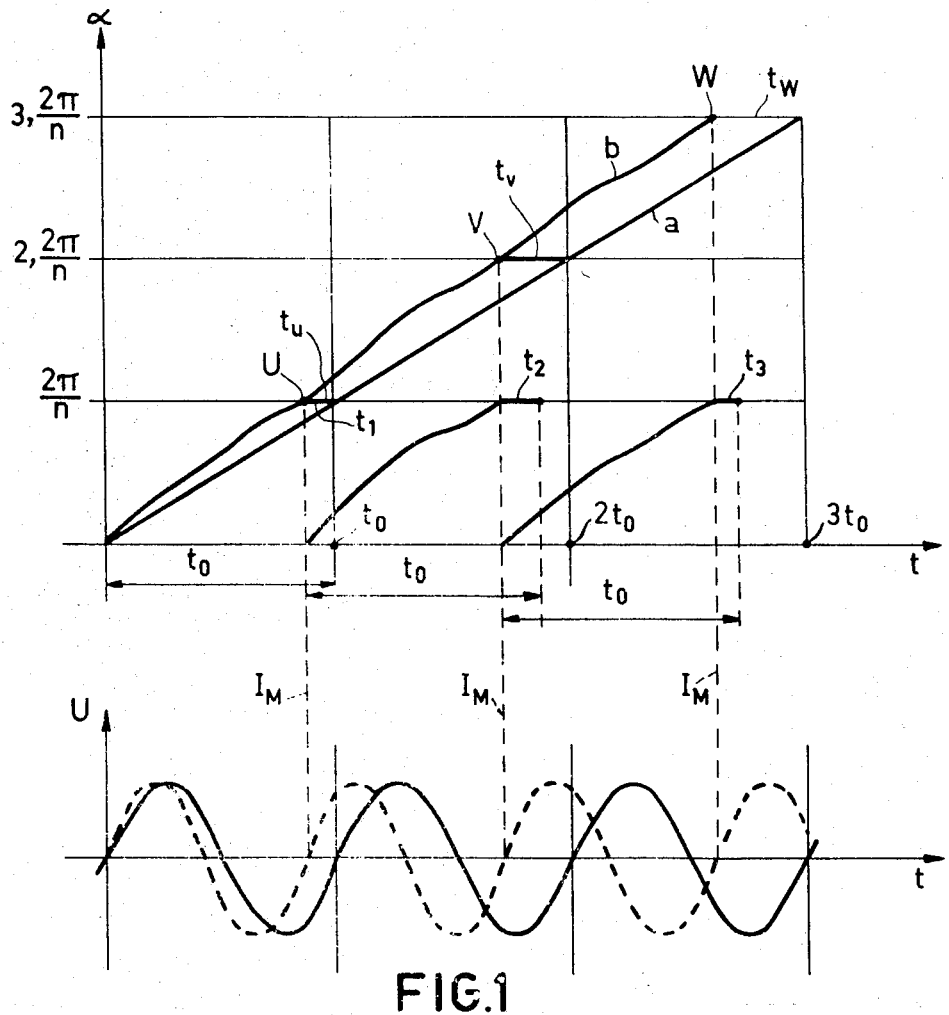
Figure 2:
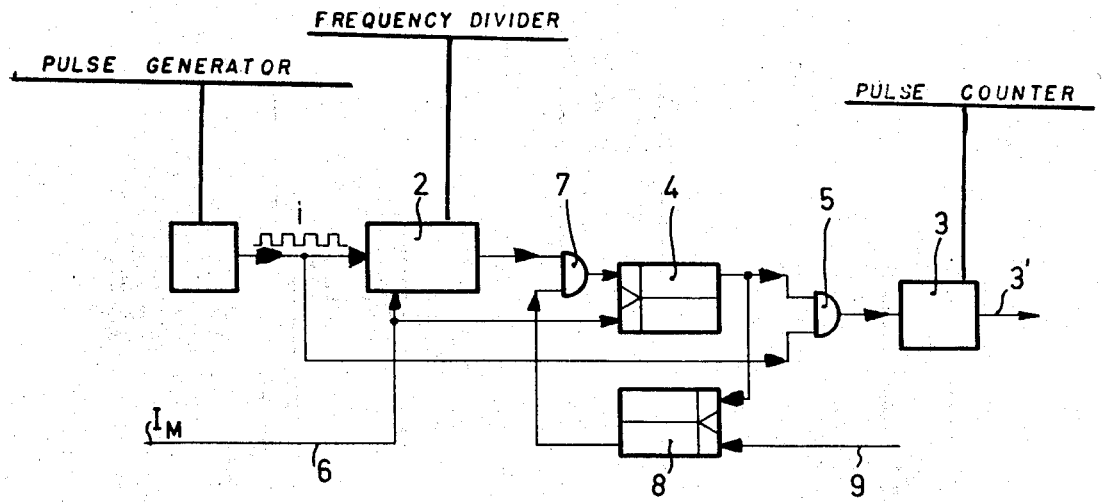
FIG. 2 shows an arrangement for carrying out the invention.

With the arrangement as shown in FIG. 2 it is possible to determine the time intervals $t_1, t_2 \ldots t$ as shown in FIG. 1. Pulses $i$ of constant frequency are supplied by a generator 1 to a frequency divider 2 dividing the reference pulse frequency in a ratio $1:m$ where, according to the invention, $m$ is an integer which amounts to a small fraction of the number $k$ of pulses $i$ that are contained in a period $t_0$. As soon as the frequency divider 2 has received $m$ pulses a bistable flip-flop 4 in response to a divider output pulse through gate 7 opens a gate 5. In addition, flip-flop 4 triggers another bistable flip-flop 8 thereby closing gate 7. The generator now supplies pulses through open gate 5 to a counter 3 having a counting capacity $n$; preferably $n$ is equal to the divisior $m$. Pulses $I_m$ on lead 6, each marking the end of a period of the alternating voltage whose phase depends upon the quantity to be measured, trigger flip-flop 4 to close gate 5 and reset the frequency divider 2 at zero, whereafter a new measuring cycle is started. Until this moment the counter may, because $n \ll k$, have counted several times up to its capacity $n$ and whenever this occurs, the counter is reset at "0" and then starts counting again.

In the course of the first and main part of each cycle the counter is, by means not shown, reset at "0," either by counting forward or by counting backward. The number of read-out pulses necessary for resetting the counter is a measure for the angle covered by the measuring spindle in the preceding cycle. The contents of the counter in a measuring cycle corresponding to the relative motion may be predetermined. Via lead 3, the read out pulses may be supplied with the correct sign to a summation counter (not shown). In case, before receiving via lead 6 the last pulse $I_m$, the counter has not counted up to half its capacity $n/2$, the read out pulses are counted with the negative sign; in the opposite case these pulses are counted with the positive sign. This also provides information regarding the sign for the summation of the angle increments. When the counter has been read out gate 7 is opened again via lead 9 and flip-flop 8. The next output pulse from the frequency divider 2 opens gate 5 and the counter again registers pulses until the next pulse $I_m$ appears which marks the end of a period $t_0$.

Figure 3:
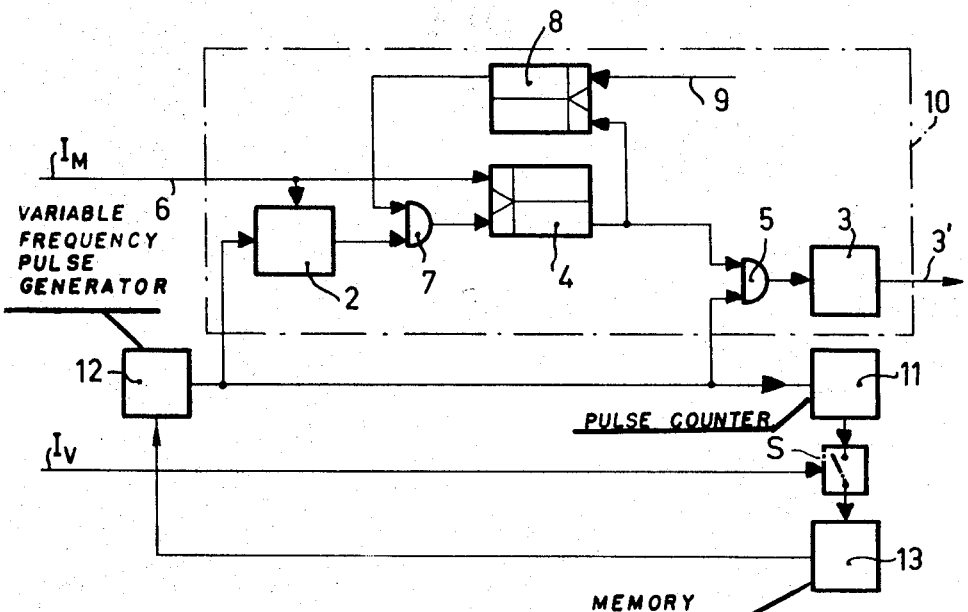
FIG. 3 shows an arrangement suitable for determining the phase change in case the period $t_0$ of the alternating voltage is variable.

It will be noticed that these means which are usually incorporated to avoid erroneous counts, have been omitted in FIGS. 2 and 3.

The capacity $n$ of the counter should have such a value that the maximum number of angle increments ever arising in a measuring cycle can be registered in half that value $(n/2)$. If $n$ is an integer, the sign of the position $n/2$ of the counter is not single valued since starting from $n/2$ the position "0" will be reached in an equal number of steps either by counting forward or by counting backward. Consequently at the arrival of a pulse $I_m$, the counter should never mark the position $n/2$ and for this reason $n$ has such a great value that this position is never reached or $n$ is so chosen that $n/2$ is an odd number, though $K/n$ still being an integer.

In this arrangement the required counting capacity does not depend on the desired degree of subdivision of the dividing discs, but only on the maximum number of linear or angular movements. For instance if it is desired to increase the degree of subdivision by a factor 1000 and if furthermore $\pm 4$ angle increments are to be covered per measuring period, then provision has to be made only for a frequency divider of ratio 10:1 and for a decade counter, whereas known arrangements would need a frequency divider of ratio 1000:1 and a counter of commensurable capacity.

In applying the principle set out, the accuracy of the measurement is determined by the constancy of the frequency of the generated alternating voltage. In case rotating discs are used for generating this voltage, small frequency variations are unavoidable.

FIG. 3 shows an arrangement for determining the phase change in case the period $t_0$ of the alternating voltage is variable.

The arrangement comprises a unit 10 similar to the arrangement according to FIG. 2, except that it does not incorporate the frequency generator 12, the latter being combined with a counter 11 and a memory 13. The capacity of the counter is again given by a whole number amounting to a small fraction of $n$. The counter continuously receives pulses from the generator 12. From a second alternating voltage, a reference voltage, a pulse series $I_v$ is derived of such nature, that the distance between successive pulses is a measure for the momentary speed of rotation of the scanning disc, or of the frequency of the rotating or travelling field. At each incoming pulse $I_v$, a switch A is put in operation, with the result that the position of the counter is stored in the memory 13, whilst the counter continuously counts on.

A counter and a memory of only small capacity are needed, in view of the fact that they only have to register the departures of the pulse phase from its prescribed value. The frequency of the generator 12 is controlled by the number of pulses stored in the memory 13, in such a way, that the frequency seeks to assume a value for which the number "0" is stored in the memory.

It may be pointed out that the frequency synchronization of the generator 12 can also be accomplished by other known means.

In contrast with known arrangements the amount of electronic equipment required to increase the resolution of the dividing discs is minimal. In order to make the scanning periods as short as possible, the frequency of the generator 12 should be high. This will not give rise to difficulties provided that the arrangements described are well shielded and are placed in the immediate vicinity of the measuring instrument. Under those conditions nothing but the linear or angular increment have to be sent over the transmission line which connects the arrangement to the indicator or to similar device. The frequency of these increments is determined by the angular, respectively translational, speed of the measuring spindle and by the resolution. Compared with the known arrangement which also comprises an adjustable frequency generator, the arrangement according to the invention has the advantage firstly that it needs fewer components and secondly that the frequency of only one generator has to follow the variations of the rotational speed of the rotor and that there is no second generator the frequency of which has to follow the variations of the rotaitonal speed of the measuring spindle. This results in an improved accuracy of the measurement because the accuracy is independent of the angular accelerations of the measuring spindle respectively independent of the linear accelerations of the translational moving body.

As to the operation of the arrangement according to the invention it does not matter how the signal representing the quantity to be measured is generated and consequently the arrangement can be used in all those cases in which the phase shift of an alternating voltage can be derived from an angular or translational displacement.

In the above described embodiments of the invention the full period of the alternating voltage is scanned. It will however be clear that it is also possible to divide the period in intervals and to interpolate these intervals in the manner described.

What is claimed is:

1. Apparatus for determining and digitally indicating the relative displacement of moving bodies from a pulsed measuring signal where the period of the measuring signal is fixed in response to zero relative displacement of the moving bodies and where the period changes in proportion to the relative displacement of the moving bodies, comprising means for generating a reference pulse series at a multiple of the frequency of the fixed zero-displacement-indicating frequency of the measuring signal, a divider having input, output and reset terminals, the output terminal of the divider providing an output pulse in response to each $m$ pulses on the input terminal following the application of a reset pulse on the reset terminal thereof, means for connecting the reference pulse series to the input terminal of the divider, means for connecting the measuring signal to the reset terminal of the divider whereby the divider output terminal provides a pulse each $m$ reference pulses following a measuring signal pulse, a cyclical counter, the capacity of the counter and the division ratio $m$ of the divider being equal to a fraction of the number of cycles of the reference pulse series generated between adjacent measuring signal pulses, and a logic circuit connected to the divider output, the reference pulse generating means, the measuring signal and to the counter, the logic circuit being triggered by a measuring pulse to a, first logical state wherein the counter is disconnected from the reference pulse generator and wherein the logic circuit is rendered insensitive to output pulses from the divider, input means for triggering the logic circuit into a second stable state wherein the counter remains disconnected from the reference pulse generator and wherein the logic circuit is rendered responsive to the output of the divider, the logic circuit being triggered in response to the concurrence of the second stable state and a divider pulse to a third stable state where in a conduction path is established through the logic circuit between the reference pulse generator and the cyclical counter, whereby the counter repetitively counts the reference pulses occurring between the divider output pulse and a next following measuring output pulse and wherein the deviation from a predetermined value of the digital output of the counter at the time of the next following output pulse digitally represents the displacement of the bodies during the two measuring pulses.

2. Apparatus as claimed in claim 1 wherein the frequency of the generating means is controlled by a second reference signal having a frequency and phase independent of the relative displacement between the bodies, the apparatus further comprising a second cyclical counter having a capacity equal to an integral submultiple of the number of generator pulses produced in one cycle of the reference signal, a memory, means for registering the contents of the second counter in the memory in response to a measuring signal pulse, and means for controlling the frequency of the generating means in response to the contents of the memory.

3. Apparatus as claimed in claim 2, wherein the second measuring signal and the reference signal frequencies are dissimilar.

4. Apparatus as claimed in claim 1, wherein the frequency of the reference signal generating means is controlled by a second reference signal having a frequency and phase independent of the relative displacement between the bodies, the apparatus further comprising a second cyclical counter having a capacity equal to an integral submultiple of the number of second generator pulses produced in one cycle of the reference signal, a memory, means for registering the contents of the second counter in the memory in response to a measuring signal pulse, and means for controlling the frequency of the first reference signal generating means in response to the contents of the memory.

5. Apparatus as claimed in claim 1, wherein the logic circuit comprises a first flip-flop having a stable set and reset states, a second flip-flop having stable set-and reset states, said first flip-flop responsive to each measuring pulse for switching to the reset stable state, a first AND gate means responsive to the reset stable state of the first flip-flop for disconnecting the output of the reference generator from the counter and for establishing a connection between the generator and counter in response to the set state of the first flip-flop, wherein the input means for triggering the logic circuit ot a second stable state comprises means for triggering the second flip-flop to the set state, a second AND gate means for establishing a conduction path between the divider output terminal and the first flip-flop in response to the set state of the second flip-flop and for removing the conduction path between the divider output terminal and the first flip-flop in response to the reset state of the second flip-flop the first flip-flop being responsive to the concurrence of the conduction path through the second AND gate and a divider output pulse from triggering to the set state theerof.

References Cited

UNITED STATES PATENTS

| 2,717,987 | 9/1955 | Hagen | 340—271 X |
| 3,034,053 | 5/1962 | Lanning et al. | 324—83 |
| 3,184,976 | 5/1965 | Greiner | 324—83 |
| 3,206,616 | 9/1965 | Webb. | |
| 3,261,007 | 7/1966 | Frisch | 340—271 X |
| 3,278,845 | 11/1966 | Cann | 324—83 X |

ALFRED E. SMITH, Primary Examiner